A. F. COOPER.
Car-Wheel.
No. 220,221.  Patented Oct. 7, 1879.
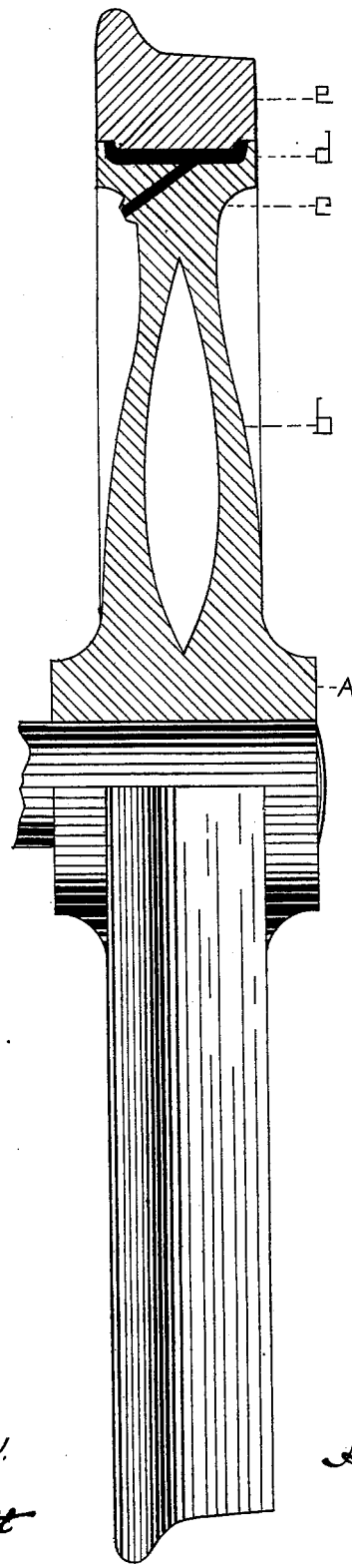
Witnesses
F. L. Houghton.
Chas. M. Abbott
Inventor
Almond F. Cooper
by Chs Houghton atty

UNITED STATES PATENT OFFICE.

ALMOND F. COOPER, OF CAMBRIDGE, MASS., ASSIGNOR TO THE COOPER ELASTIC STEEL WHEEL COMPANY, OF HARTFORD, CONN.

IMPROVEMENT IN CAR-WHEELS.

Specification forming part of Letters Patent No. 220,221, dated October 7, 1879; application filed July 11, 1879.

*To all whom it may concern:*

Be it known that I, ALMOND F. COOPER, of Cambridge, in the county of Middlesex and Commonwealth of Massachusetts, have invented an Improvement upon the Construction of Railroad-Car Wheels described in Patent No. 187,967, issued to me March 6, 1877, of which the following is a specification.

The wheel described in the patent referred to consisted of a central piece, including the hub, web, and rim or tread, a tire of steel placed upon the wheel while expanded by heat, and when cooled contracting so that the parts of each intended to do so would interlock with each other, so that the tire could not come off the wheel except by heating, at the same time leaving a space between the tire and the wheel to be filled with india-rubber and vulcanized there. The space between the wheel and the tire extended clear across the face of the tread, leaving an opening on both sides of the wheel of about a quarter of an inch, which it was necessary to close securely while the rubber was being forced in and vulcanized. This was found difficult, if not impracticable, and the wheel had some tendency to work loose in the tire.

My present described invention was intended to and does obviate all the difficulties referred to existing in the construction described in my former patent; and consists, mainly, in so making the tire and the central portion of the wheel that the outer edges of the face of the rim or tread of the wheel and the outer edges of the inside periphery of the steel tire, when the tire is placed on the wheel, come together and fit to each other, thus inclosing the cavity between the tire and the wheel, which receives the rubber packing, so that the rubber cannot escape while being forced into it and vulcanized, and it cannot be forced out at the sides while the wheel is in use. I also put the locking-projection on the inside of the tire instead of on the face of the tread, as in my former patent, and the groove to receive it and the rubber packing in the face of the tread instead of in the tire, as before described.

To make my improved wheel, I cast the central portion, of good iron, (or it may be forged of wrought-iron,) in one piece, including the hub, web, or plate; the rim or tread with a groove in the face of the tread about one-half or five-eighths inch deep, and extending clear around the wheel and to about three-fourths of an inch from the outer sides of the rim or tread. These outer sides of the rim or tread are turned off, so that the diameter of the wheel through them is very nearly the same as the inside diameter of the tire at the outer sides of the locking-projection. In casting the wheel I leave two or more holes through from the inside of the rim or tread to the cavity on the face of the tread, in which the rubber is to be deposited. These holes are reamed out to receive the nozzle of the engine, which forces the rubber into the wheel, and are plugged securely after the rubber is forced in. The tire is made from a good quality of steel for the purpose, of proper width and thickness, with or without a flange, as may be desired, its outer and inner sides turned off in proper form and dimensions, with a locking rib or projection extending around its inner periphery and to within about three-quarters of an inch of its outer edges, the depth or shoulder of this locking ridge or projection being about one-sixteenth of an inch, or a little less than that may be found sufficient. The tire is then heated uniformly throughout its whole length to a dark red, and thus so expanded that it will go on the wheel. On cooling it, the rib or locking-projection is brought, by the contraction of the tire, into the groove in the face of the tread of the wheel, thus locking the wheel and the tire together, so that they cannot be separated except by heating and expanding the tire.

There is between the tire and the wheel a cavity extending clear around the wheel and across the face of it to within about three-quarters of an inch of its sides, which is about half an inch or five-eighths deep, to receive the rubber packing. Outside of this cavity the steel tire and the face of the tread of the wheel come in contact with and fit to each other so closely that when the rubber is forced in it cannot escape between them; but the air will be forced out, and a thin film of rubber will be forced between the steel tire and the wheel.

The rubber is prepared by grinding and mixing with the proper chemical substances for vulcanizing and the wheel and tire moderately heated, and then, by an engine properly constucted for the purpose, and moved by a hydraulic press, the rubber is forced through the holes in the tread of the wheel before described into the cavity between the face of the tread of the wheel and the steel tire until it is completely filled with the prepared rubber, the pressure in the forcing-engine being continued and increased until the rubber is driven in a thin film between the outer edges of the steel tire and the outer sides of the face of the tread, appearing on the outside of the wheel. The holes through which the rubber is forced are then securely plugged, and the wheel (and several at a time may be done) is placed in the vulcanizing-oven, and, the proper degree of heat being applied and continued the required time, the rubber is vulcanized, and the wheel is complete and ready to be fitted to the axle.

Such a wheel cannot be broken by use, and the wear upon the points of contact with the rail is very slight, their durability being much greater than that of ordinarily-constructed wheels.

It will be perceived that this wheel is not, in the ordinary acceptation of the term, elastic, the rubber being so confined as to be practically unyielding; but it cuts off the vibration between the wheel and its tire and obviates any tendency to crystallization of the metal of either wheel or tire.

Other substances, and perhaps soft metals, may be used in the space between the wheel and the tire with good effect; but I believe rubber to be better than any other substance for this purpose.

The drawing annexed shows a half-sectional view of my wheel.

$a$ is the hub. $b$ is the web or plate. $c$ is the rim and tread. $d$ is the rubber packing, and $e$ is the steel tire.

I am aware that vulcanized india-rubber has been used in railroad-car wheels, between the hub and the tread, in many different forms, and do not claim its use either broadly or in any of the many different forms in which it has been patented or used; and also that railroad-car wheels have been made with a cast-iron central portion, both in parts and whole, with steel tires, and packed with vulcanized india-rubber, and that rubber has been injected into the wheel and vulcanized there, and do not claim any of these as my invention; nor do I claim here the invention described and claimed in my Patent No. 187,967; but I do claim as new and my invention—

A railroad-car wheel consisting of a hub, a web or plate or spokes, and a rim or tread, all in one piece, grooved in the face of the tread, a steel tire made with a rib or projection on and extending around its inner periphery, which enters and lies in the groove in the face of the tread, locking the tire and wheel together, but only partially filling the groove, a packing of india-rubber vulcanized in the groove in the face of the tread inclosed by the contact of the outer edges of the steel tire and the face of the tread, all made and arranged with relation to each other substantially as described.

ALMOND F. COOPER.

Witnesses:
CHS. HOUGHTON,
F. L. HOUGHTON.